United States Patent [19]
Robert

[11] Patent Number: 6,020,814
[45] Date of Patent: Feb. 1, 2000

[54] VEHICULAR DECELERATION WARNING SYSTEM

[76] Inventor: Ivan N. Robert, 15716 Acapulco Dr., Houston, Tex. 77040-2102

[21] Appl. No.: 08/824,403

[22] Filed: Mar. 26, 1997

[51] Int. Cl.$^7$ ..................................................... B60Q 1/50
[52] U.S. Cl. .......................... 340/467; 340/441; 340/466; 340/472; 340/479; 307/10.8
[58] Field of Search ..................................... 340/438, 441, 340/463, 464, 466, 467, 468, 469, 471, 472, 479; 307/10.8

[56] References Cited

U.S. PATENT DOCUMENTS

| | | | |
|---|---|---|---|
| 3,601,794 | 8/1971 | Blomenkamp | 340/467 |
| 4,357,594 | 11/1982 | Ehrlich et al. | 340/467 |
| 4,800,377 | 1/1989 | Slade | 340/467 |
| 4,841,276 | 6/1989 | Abel et al. | 340/467 |
| 4,952,909 | 8/1990 | Woerner et al. | 340/479 |
| 5,043,698 | 8/1991 | Tabacchi | 340/467 |
| 5,121,100 | 6/1992 | Gallo | 340/467 |
| 5,231,373 | 7/1993 | Freeman et al. | 340/467 |
| 5,426,414 | 6/1995 | Flatin et al. | 340/472 |
| 5,481,243 | 1/1996 | Lurie et al. | 340/467 |
| 5,499,009 | 3/1996 | Davis | 340/479 |
| 5,589,817 | 12/1996 | Furness | 340/467 |

*Primary Examiner*—Daniel J. Wu
*Attorney, Agent, or Firm*—Pravel, Hewitt & Kimball

[57] ABSTRACT

A passive warning system for communicating vehicular deceleration and other information through a warning light. A microprocessor-based warning system according to the invention accounts for variations in vehicular speed and ambient driving conditions in generating a warning signal having an intensity or blinking rate related to a rate of deceleration. The microprocessor is also programmed to measure deceleration more frequently as the speed of the vehicle increases, allowing information to be communicated in a timely manner. In one embodiment of the invention, the microprocessor is programmed to maintain the highest intensity warning signal activated for a predetermined period of time in order to inform other vehicles of an earlier speed reduction. Further, a warning system according to the invention can be configured to communicate a high intensity warning signal if the wheels of the vehicle become suddenly blocked or rotate at a rate that is disproportionate to the speed of the vehicle. Various other features and embodiments are encompassed within the scope of the invention.

19 Claims, 5 Drawing Sheets

VEHICULAR DECELERATION WARNING SYSTEM

BACKGROUND OF THE INVENTION

1. Field of the Invention

The present invention relates to automotive warning systems, and more particularly to a microprocessor-based visual warning system that accounts for variations in vehicular speed and other factors in providing a variable warning signal to trailing vehicles.

2. Description of the Related Art

Drivers of automobiles have two main methods of communicating their presence and intentions to one another—by visual means such as lights and by audible means such as a horn The horn allows a driver to communicate with other drivers and pedestrians who may not be in visual contact. Lights allow drivers to visually inform others of their presence and intentions.

Automobiles typically incorporate a variety of lights, with most operating in pairs. Pairs of lights used to send specific information or perform other functions are customarily placed at the front, back and sides of an automobile. For example, pairs of turning lights can be activated prior to a change in direction. Pairs of emergency flashing lights are used to apprise others of hazardous conditions or as a distress signal. Headlights with low and high beams are used primarily to allow the driver to see and be seen at night. Finally, a pair of brake lights and a pair of back-up warning lights are conventionally placed at the back of automobiles to inform following drivers of braking and backing activities. Generally, the brake lights are simply illuminated when pressure is applied to the automobile's brake pedal—the brake lights do not provide any information regarding the magnitude of speed reductions with respect to the automobile's speed and ambient driving conditions.

The standard pairs of lights described above can be divided in two groups depending on how they are operated.

The first group includes lights actively operated by the driver with the sole and full intention of sending specific information to other drivers or when a particular driving environment renders their usage inevitable. This group is comprised of turn signal lights, emergency flashing lights, parking lights and headlights.

A second group includes those lights that are passively activated or operated by the driver. These lights are switched on and off automatically in response to particular vehicular operations. Brake lights (including any center-mounted rear brake lights) and back-up warning lights are included in this second group of lights. Passive lights are capable of providing limited information simultaneous with the occurrence of specified operations.

There are known prior art warning light systems that suggest varying the intensity or frequency of blinking rate in response to a variable such as the magnitude of deceleration brought about by braking operations. For example, U.S. Pat. No. 3,760,353 to Blomenkamp et al. describes a signal light that flashes after a predetermined level of deceleration is measured. Similarly, U.S. Pat. No. 4,355,594 to Ehrlich et al. describes a hazard warning indicator that is energized to a magnitude that is proportional to the degree of deceleration of a vehicle or other measurement such as brake pressure; U.S. Pat. No. 5,481,243 to Lurie et al. dual audio and visual indicators that depend on differential vehicular deceleration measurements; U.S. Pat. No. 4,952,909 to Woerner et al. an early warning system for anticipating vehicle braking by monitoring depression of the vehicle's accelerator; and U.S. Pat. No. 5,231,373 a signal light source with an intensity level that varies as a function of at least one safety-affecting parameter and a time-varying function compensating for physiological inability to perceive certain changes in intensity levels.

These systems suffer from major shortcomings. For instance, the intensity or frequency of warning signals is the same for a given rate of deceleration, regardless of a vehicle's actual speed. In addition, these systems largely ignore ambient driving conditions in calculating the intensity of a warning signal.

SUMMARY OF THE INVENTION

Briefly, the present invention provides a passive system that quickly communicates the intensity of vehicular deceleration through a warning light and improves upon the prior art in a number of aspects.

A microprocessor-based warning system according to the invention accounts for variations in vehicular speed and ambient driving conditions in generating a warning signal having a blinking rate that is a function of the rate of deceleration. Accordingly, the microprocessor is programmed to be increasingly responsive to deceleration as vehicle speed increases, allowing braking information to be communicated within a shorter period of time when the required reaction end braking times of other drivers is reduced.

In one embodiment of the invention, the microprocessor is also programmed to keep the highest warning signal activated for a given period of times in order to inform vehicles arriving in the vicinity of a sudden speed reduction and that hazardous; traffic conditions may still exist. This features reduces the possibility of "pile-up" collisions involving a multitude of vehicles.

Further, a warning system according to the invention can be configured to communicate a high intensity warning signal if the wheels of the vehicle become suddenly locked as might occur during a hard braking event or collision, or if the wheels of the vehicle rotate at a rate that is disproportionate to the speed of the vehicle, as might occur during icy driving conditions. By monitoring such sudden wheel speed changes, the warning system is able to alert other drivers to potentially hazardous situations. In addition, the warning system is provided with a reset button that must be depressed in order to deactivate the warning signal and/or hazard lights following a sudden wheel speed change. In the event of an accident, the continuous warning signal enables other drivers to more readily locate an injured or unconscious driver.

In yet another embodiment, the microprocessor can also be programmed to generate a warning signal when a vehicle is travelling at a very low speed. Again, this feature reduces the possibility of "pile-up" collisions.

As will be shown, the invention is capable of numerous other and different embodiments and applications, and various details of the invention are capable of modification without departing from the spirit of the invention as set forth in the appended claims, nor exceed the scope thereof. Accordingly, the drawings and descriptions are to be regarded as illustrative in nature, and not as restrictive.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
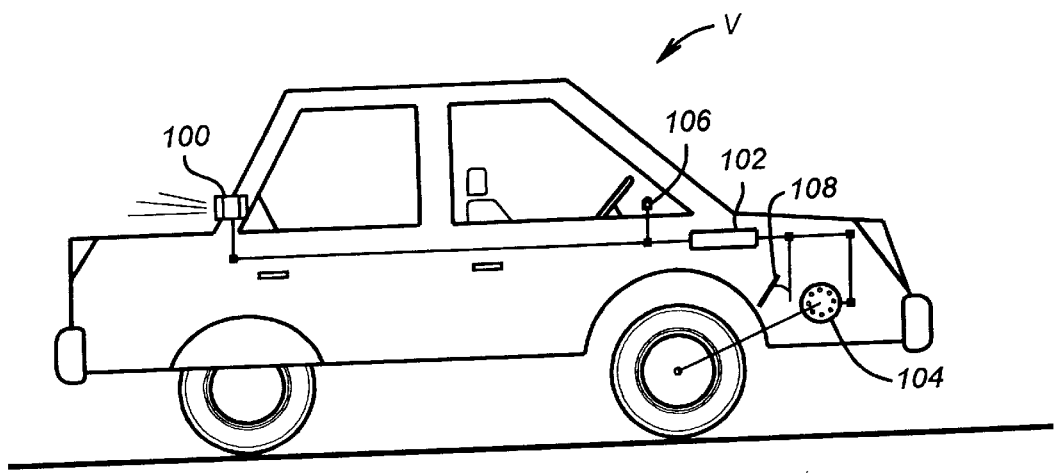
FIG. 1 depicts an automobile incorporating a warning system according to the present invention.

Turning now to the drawings, FIG. 1 depicts an automobile V incorporating a warning system according to the present invention, The warning system is comprised of five main components: a warning light 100, a microprocessor card 102, a sensor 104, a reset button 106, and a gas pedal contact 108. The warning system can be installed in all types of vehicles, including: motorcycles, cars, trucks, buses, snowmobiles and other off-road vehicles.

Figure 3:
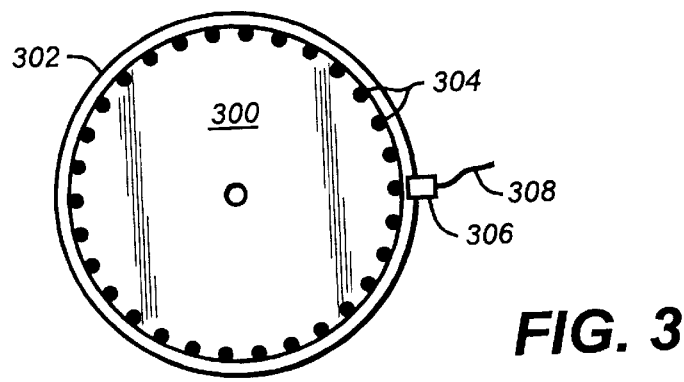
FIG. 3 is a side view of a sensor disc for use in a warning system according to the present invention.
Figure 4A:
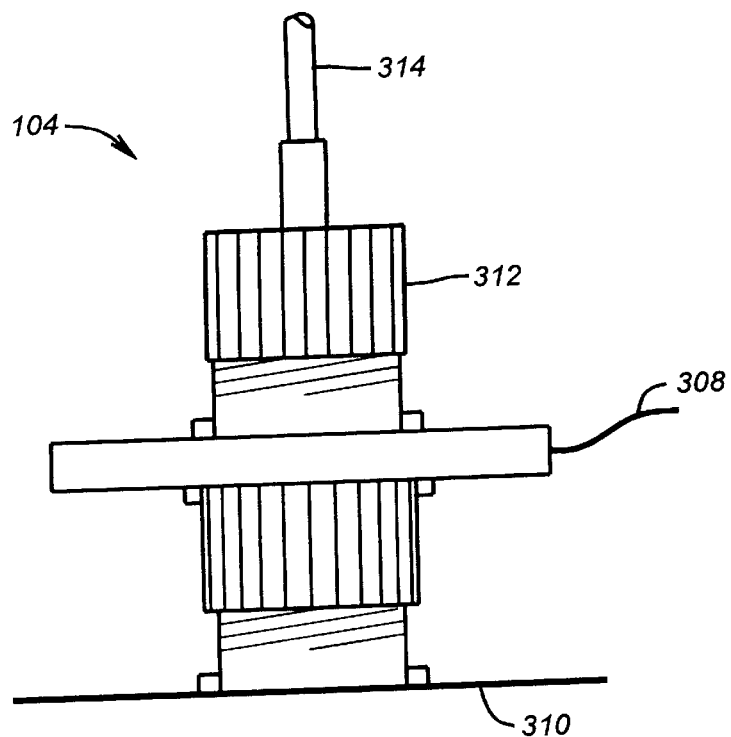
FIGS. 4A and 4B are top and cross-sectional views, respectively, of a sensor according to the present invention incorporating the sensor disc of FIG. 3, and FIGS. 5A–5C are flowchart diagrams depicting operation of a warning system in accordance with the present invention.
Figure 4B:
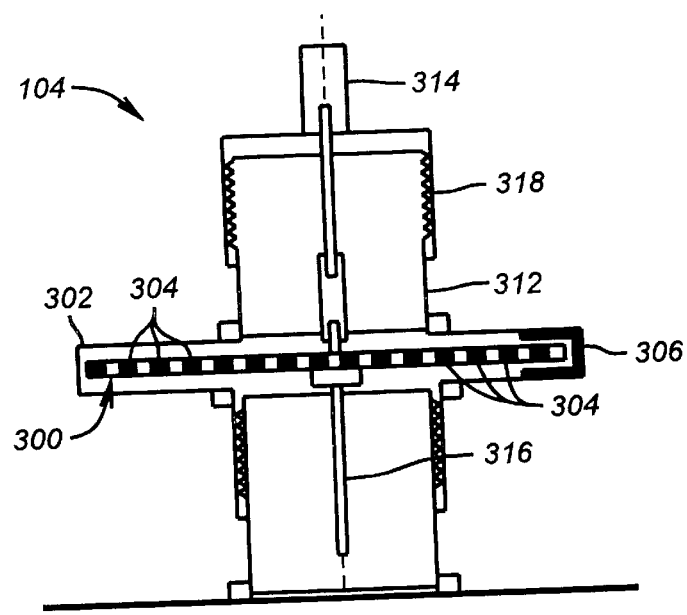

The sensor 104 of the disclosed embodiment is a relatively simple device used to generate electrical pulses that correspond to revolutions of the tires of automobile V. These electrical pulses are communicated to a binary meter 202 (FIG. 2) on the microprocessor card 102 to be used in calculating the speed and rate of acceleration/deceleration of the automobile V. An exemplary embodiment of the sensor 104 is shown in FIGS. 3, 4A and 4B, while calibration of the sensor 104 is discussed in conjunction with FIGS. 5A–5C.

The microprocessor card 102 incorporates the components of the system used to select different warning signal rates and to communicate with the warning light 100. In addition to the sensor 104, the microprocessor card 102 receives signals from the reset button 106 and the gas pedal contact 108.

The microprocessor card 102 can be placed anywhere in the automobile V, but is preferably located out of sight where it will not be accidentally disturbed. In the disclosed embodiment of the invention, the warning light 100 is placed at the back of the automobile V, and may take the place of a rear-mounted brake light. The reset button 106 is placed in the cab of the automobile V, within reach of the driver. The reset button 106 may be configured to flash and/or beep when the microprocessor card 102 needs to be manually reset. The gas pedal contact 108 (FIG. 2) is utilized to detect pressure on the gas pedal 108a. The microprocessor card 102 is preferably powered by the automobile's battery (not shown).

Figure 2:
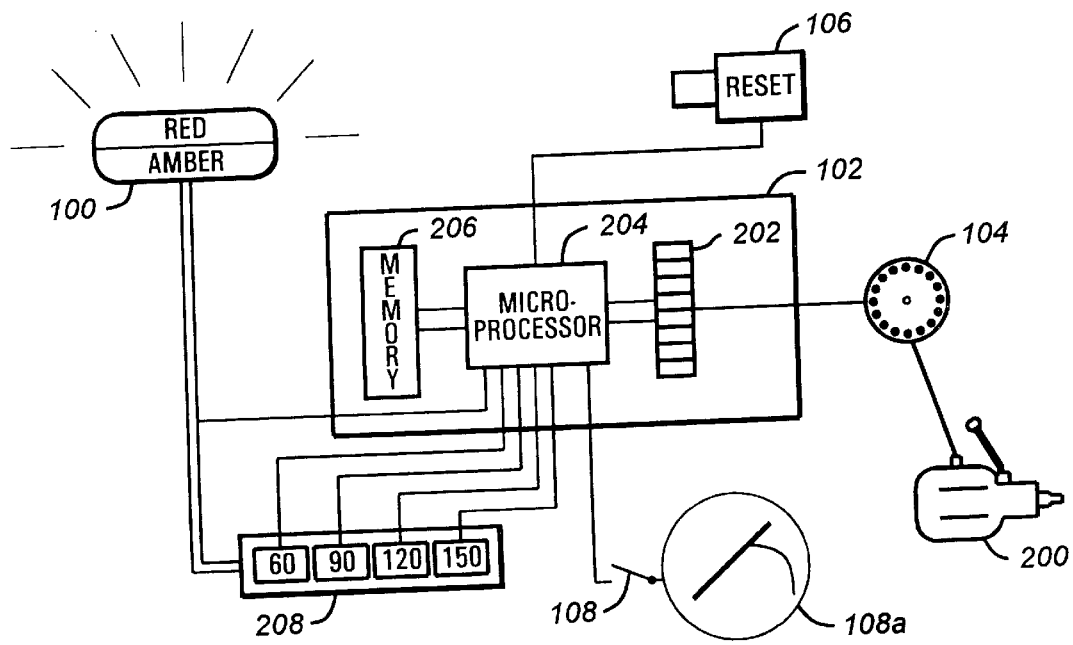
FIG. 2 is a block diagram of warning system according to the present invention.

Referring more specifically to FIG. 2, a simplified block; diagram of a warning system according to the present invention is shown. The sensor 104 is coupled through a drive shaft, cable, or gear box 200 (in manner similar to a speedometer connection) to the microprocessor card 102. While the automobile V is moving, the sensor 104 continuously transmits pulses to a binary meter 202. The binary meter 202 maintains a running total of pulses received until cleared by the microprocessor 204. As described below, the microprocessor 204 reads and resets the binary meter 202 at a rate that increases with the automobile's speed.

In addition to the binary meter 202, the microprocessor card 102 incorporates the microprocessor 204 and memory 206. The memory 206 is used to store variable values and instructions directing the microprocessor 204 to perform operations and calculations such as those depicted in FIGS. 5A–5C. It is also contemplated that the microprocessor 204 and memory 206 could be integrated on a single integrated circuit (IC). The gas pedal contact 108 is installed under the gas pedal 108a or under the automobile's hood, and is configured to communicate a signal to the microprocessor when pressure is applied to the gas pedal 108a.

The microprocessor 204 is coupled to and controls a blinking), rate controller 208. The blinking rate controller 208 provides actuation signals to the warning light 100, causing the warning light 100 to blink or flash at any of a number of predetermined rates. In the disclosed embodiment, the warning light 100 is capable of flashing at four different blinking rates, each of which is readily distinguishable from the others. Selection of the different blinking rates depends upon the warning level selected, which itself corresponds to categories or ranges of deceleration rates calculated by the microprocessor 204. The blinking rates of the disclosed embodiment, expressed in terms of blinks per minute (BPM), are:

60 BPM for low to medium/low deceleration rates;

90 BPM for medium/low to medium/high deceleration rates;

120 BPM for medium/high to high deceleration rates; and

150 BPM for an emergency signal.

For very low deceleration rates, the blinking rate controller 208 is by-passed so that the warning light signal is continuous. Further, to better attract people's attention when the automobile V is involved in an accident and is not visible from the road, the highest blinking rate (150 BPM) can be combined with activation of the automobile's hazard lights.

The present invention is capable of processing data regarding an automobile's speed and rate of deceleration to warn other drivers, within a few tenths of a second, when a predetermined and potentially dangerous rate of deceleration is detected. The warning system thereby allows other drivers to react in a timely fashion and avoid preventable collisions.

To be effective, however, the warning signal should remain simple and easy to understand, and is ideally not subject to different interpretations. For example, if the warning signal is an increase in light intensity corresponding, to increases in the deceleration, the warning signal may be seen and interpreted differently by the different drivers, and precious tenths of a second may be wasted in determining the magnitude of impending danger. Variations in light sources (i.e., different sizes and shapes of lights), ambient light and weather conditions, and distance all serve to reduce the desirability of this type of warning signal. For this reason, the warning signal of the preferred embodiment is the flashing of a warning light 100. Flashing signals are used all over the world to attract people's attention and signal danger. Police cruisers, ambulances, fire trucks, tow trucks, and even airplanes and helicopters all utilize flashing devices or strobes to alert others to their presence.

To further aid in interpretation of the warning signal, the color of the warning light 100 is preferably red, or, alternatively, a combination of the a red color and an amber color. In embodiments utilizing both colors, each color exhibits two flashing rates (e.g., 60 and 90 BPM for the amber light and 90 and 120 BPM for the red light). In, this embodiment, the amber portion of the warning light 100 generally signals low to low/medium deceleration rates, while the red portion warns drivers of medium/high to high deceleration rates. Alternate activation of both the amber and red portions of the warning light 100 at the highest rate (120 BPM) can be used as an emergency signal.

In the event the warning system of the present invention is integrated with a braking system (for instance, if the warning light 100 replaces a standard rear-mounted brake light), it is desirable that any control signals communicated from the blinking rate controller 208 to the warning light 100 have priority over normal brake signals. When activated, standard brake lights do not always indicate that the automobile V is decelerating. In fact, it is possible that the automobile V could be accelerating while the brake lights are activated (e.g., the automobile is travelling down a steep incline). Likewise, the automobile V can experience periods of deceleration without activation of the normal brake lights (e.g., the automobile is traveling up a steep incline). It is therefore desirable that normal brake light signals and the warning signal of the present invention remain distinct. In this manner, other drivers can remain informed of the intensity of any speed reductions experienced by the automobile V regardless of any braking signals.

Turning now to FIG. 3, details of a spinning sensor disc 300 for use in a warning system according to the present invention are provided. The sensor disc 300 incorporates a number of rotating magnets 304 distributed equally about its periphery. The disclosed embodiment of the invention incorporates thirty of the rotating magnets 304. The sensor disc 300 and rotating magnets 304 are disposed within a disc frame 302. A fixed magnet 306 is also disposed within the disc frame 302. When the automobile V is in motion, a rotating drive shaft 316 (FIG. 4B) causes the sensor disc 300 to rotate. In turn, rotation of the sensor disc 300 causes the rotating magnets 304 to pass in close proximity to the fixed magnet 306. Each time one of the rotating magnets 304 passes the fixed magnet 306, an electrical pulse is induced. The induced electrical pulses are communicated to the binary meter 202 via a wire 308.

Top and cross-sectional views, respectively, of an exemplary sensor 104 incorporating the sensor disc 300 of FIG. 3 are shown in FIGS. 4A and 4B. Referring first to FIG. 4A, the sensor 104 is mounted via a connection 310 to a speedometer driver (not shown). The connection 310 is the point at which the speedometer cable 314 connects in prior art automobiles. The construction of the speedometer driver is not considered critical to the invention, and can be of any type as known to those skilled in the art. In the disclosed embodiment, the speedometer cable end 318 is used to connect the speedometer cable 314 to the sensor 104 via a speedometer cable adapter 312.

As shown in more detail in FIG. 4B, the rotating drive shaft 316 is perpendicularly connected to the center of the sensor disc 300. The rotating drive shaft 316 of the disclosed embodiment is also used to control motion of the speedometer cable 314. The rotating drive shaft 316 can be any type of shaft or gear that rotates relative to motion of the wheels of the automobile V. As noted, rotation of the rotating drive shaft 316 causes the sensor disk 300 to rotate, thereby generating electrical pulses that are communicated to the binary meter 202. The binary meter 202 maintains a running total of the pulses received until it is reset, at which point it begins maintaining a new running total of pulses.

Many alternate embodiments of the sensor 104 are possible. For example, on many types of automobiles, the speedometer is not driven by a cable. Instead, a sensor in the automobile's gear box is used to produce an electrical value that is communicated to the speedometer. The electrical value increases as the speed of the vehicle increases, with variations being reflected in the miles per hour or kilometer per hour of the speedometer. The scope of the present invention is not considered to be limited by a specific implementation of the sensor 104, and variations in the implementation of sensor 104 do not significantly impact operation of the warning system.

Basic Operation of the Warning System

Briefly, a warning system according to the present invention operates in the following manner. At various intervals of time, the length of which depends upon the absolute speed of the automobile V, the microprocessor 204 queries the binary meter 202 to determine how many pulses have been counted since the binary meter 202 was last queried and zeroed. In this manner, the microprocessor 204 can determine the approximate speed of the automobile V. The microprocessor 204 compares this information to a previously stored value to determine a deceleration value reflecting the rate of acceleration or deceleration being experienced by the automobile V. If the automobile V is decelerating, the deceleration value is compared to a plurality of predetermined levels. Depending on the rate of deceleration, the microprocessor 204 either: (1) activates one of a set of discrete warning signals corresponding to the deceleration value, (2) turns off a previously activated warning signal, or (3) does nothing. The process is then repeated at a rate that is a function of the previously measured speed of the automobile V, such that the rate of deceleration is checked more frequently at higher speed levels. For a given rate of deceleration, the blinking rate of the warning signal varies with both the measured ambient conditions and the speed of traffic. These variations in the warning signal and the frequency at which the deceleration of the vehicle is measured provide several advantages over prior art warning systems.

Consider the fact that the distance required for an automobile to stop is function of both the reaction time of the driver in identifying a braking event before applying the brake pedal and the actual distance required for braking. The average reaction time for an individual typically ranges from three quarters of a second to a full second or more, depending on the physical and mental condition of the individual. The reaction time of an individual (and subsequently the distance required for braking) increases when a driver cannot immediately evaluate a dangerous situation or when he/she underestimates the situation due to lack of information about preceding vehicles.

For example, it is easy for a driver to underestimate the urgency of the situation, particularly when the preceding vehicle has decelerated rapidly and its, brake lights are no longer activated. This phenomenon can be observed in multi-car collisions—drivers at the end of such collisions often suffer much greater damage or physical injury than drivers at the head of such collisions.

Further, the actual distance required for braking following application of the brake pedal depends upon numerous physical factors. Such factors include: the road conditions, the ambient weather conditions, the quality of the automobile's tires, and the automobile's mass and speed.

It is therefore desirable that, for a given rate of deceleration, the intensity of the warning signal generated by the automobile V be a function of the speed of the automobile. It is further desirable that the intensity of the warning signal reflects the highest rate of deceleration that is measured within a given period of time. In order to allow following drivers to respond more quickly, a warning system, according to the disclosed embodiment of the invention, is also capable of analyzing deceleration data at a rate that increases with the speed of the automobile V.

Figure 5A:
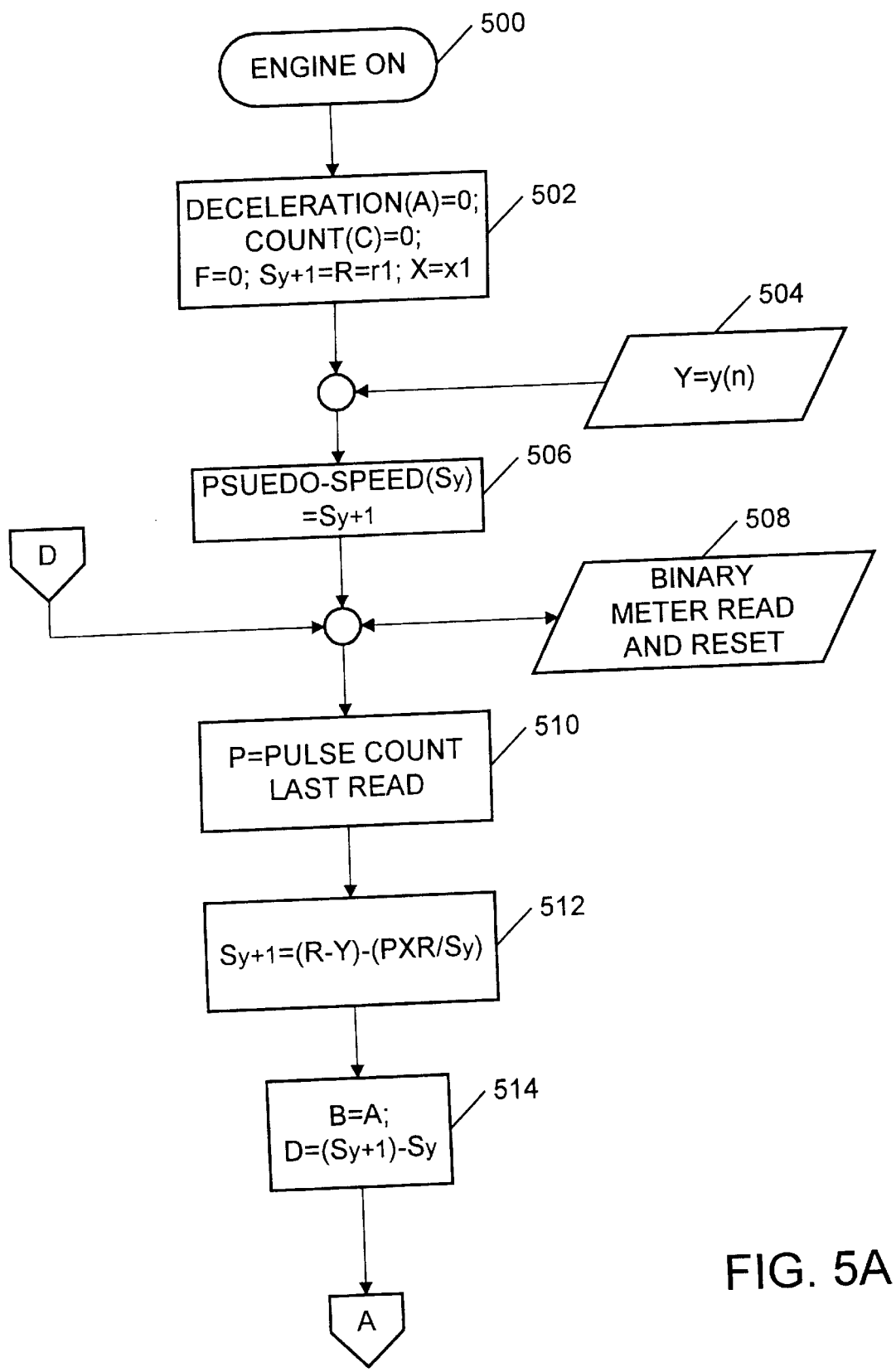
Figure 5B:
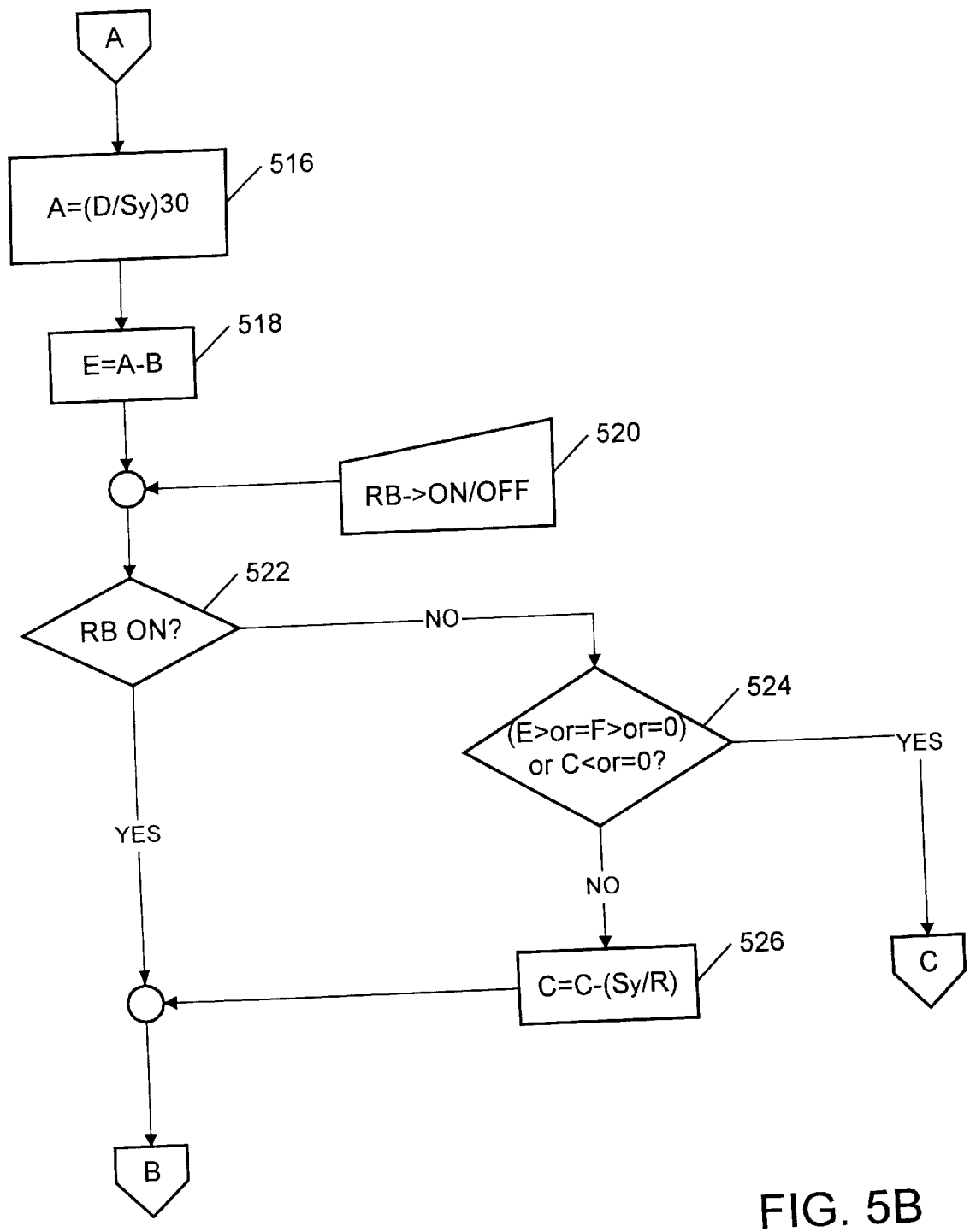
Figure 5C:
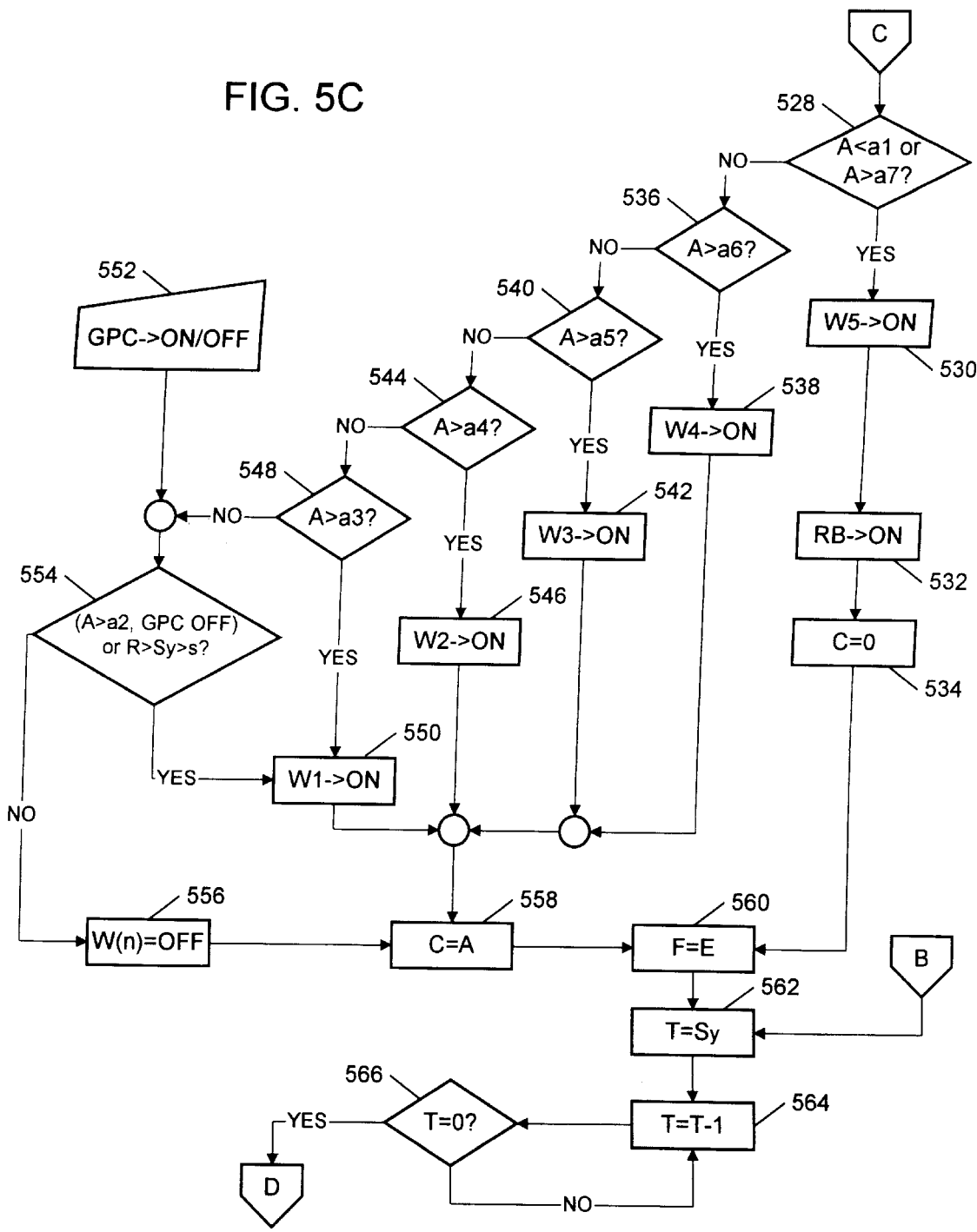

Referring now to FIGS. 5A–5C, operation of a warning system in accordance with the present invention is depicted. The following table summarizes various acronyms and variables used to describe operation of this warning system:

| VARIABLE | DESCRIPTION |
| --- | --- |
| BM | Binary Meter |
| BPM | Blinks Per Minute |
| GPC | Gas Pedal Contact |
| RB | Reset Button |
| W(n) | Intensity level of warning signal |
| A | deceleration variable/deceleration value |
| B | Previous deceleration value |
| C | Number of Cycles to be performed by the microprocessor in order to activate a warning signal for a given period of time |
| D | Difference between current pseudo-speed ($S_{y+1}$) and pseudo-speed last calculated ($S_y$) |
| P | Number of Pulses sent to binary meter within a given period of time |
| R | Constant used in the formula for calculation of $S_{y+1}$ |
| $S_{y+1}$ | Pseudo-speed calculated by formula $S_{y+1} = (R-Y)-PXR/S_y$ |
| $S_y$ | Previous pseudo-speed |
| T | Delay of a timer in milliseconds |
| X | Preset wheel and/or sensor standardization coefficient |
| Y | Adjustment variable corresponding to ambient conditions |

The following table is representative of different warning levels:

| | |
| --- | --- |
| W1 | The light is continuous (no blinking) |
| W2 | The light blinks at 60 BPM |
| W3 | The light blinks at 90 BPM |
| W4 | The light blinks at 120 BPM |
| W5 | The light blinks at 150 BPM |

Further, a1, a2, a3, a4, a5, a6, a7, r, s, and x are variables having predetermined factory-set values such that a1<a2<a3<a4<a5<a6<a7 and r>0, s>0 and X≧1. Lastly y(n) is a variable having a value determined by ambient road conditions.

Referring now to FIG. 5A, the warning system commences operation when the engine is activated at step 500. Control proceeds to initialization step 502, and the deceleration variable (A), the cycles count variable (C), and the variable F are all initialized to zero. In addition, the pseudo-speed variable ($S_{y+1}$) and the constant R are initialized to r. Further, the preset wheel and/or sensor standardization coefficient X is initialized to x1. Variations in the preset wheel and/or sensor coefficient variable X are used to account for different sensor 104 types, or can be used to standardize calculations based on different wheel gear to shaft sizes.

At step 504, the warning system receives information regarding ambient road conditions. This information is reflected as variable Y. This ambient condition variable Y typically represents weather (precipitation, fog) and light (day, night) conditions. The variable Y is assigned a larger value as driving conditions deteriorate. Many types of sensors are suitable for measuring the ambient conditions. For example, the value of Y may depend upon activation of the vehicle's lights and/or windshield wipers. Following either step 502 or 504, control proceeds to step 506 and the pseudo-speed variable ($S_y$) is set equal to the pseudo-speed variable $S_{y+1}$. As the speed of the automobile V increases, the value of $S_y$ and the value of $S_{y+1}$ decrease, as will be seen below.

Control next proceeds to step 508 and the microprocessor 204 reads and resets the binary meter 202. Control proceeds to step 510 where the variable P is assigned the value of the pulse count last read from the binary meter 202. Control then proceeds to step 512 for calculation of the pseudo-speed variable $S_{y+1}$, from the formula $(R-Y)-(PXR/S_y)$. Control next proceeds to step 514 where the variable B is assigned a value equal to A, and the difference between the pseudo-speed variable $S_{y+1}$, and the variable $S_y$ is stored as the value D.

Control proceeds to step 516 (FIG. 5B) where the deceleration variable A is calculated from the formula $(D/S_y)$ 30, where 30 may be replaced by any other number generally corresponding to the number of rotating magnets 304. Control passes to step 518 and the difference between the new value of deceleration variable A and its previous; value is stored as the temporary variable E. Next, in step 520 the ON/OFF state of the reset button (RB) is retrieved. Control proceeds to step 522 to determine if the reset button has been activated. If not, control passes to 524 to determine if the variable E is greater than or equal to F and also greater than or equal to zero, and/or the count variable C is less than or equal to zero. If not, the count variable C is recalculated in step 526 using the formula $C=C-(S_y/R)$. If the conditions of step 524 are met, control proceeds to step 528 (FIG. 5C). The significance of these steps is discussed more fully below.

Step 528 is the beginning of the warning signal intensity level selection process. The deceleration variable A is compared against the factory-set values a1–a7 to determine the appropriate warning signal intensity level. In step 528, the deceleration value A is first examined to determined if it is less than the predetermined minimum value a1 or greater than the predetermined maximum value a7, such as might be the case when the wheels are overspinning on a slippery surface or suddenly locked. In this event, control proceeds to step 530 and the warning signal is activated at its highest intensity level (W5). Control then proceeds to step 532 and the reset button is activated such that it must be depressed before the highest intensity warning signal W5 can be deactivated. Control proceeds to step 534 and the count variable C is set to zero.

If the deceleration variable A is not within the range specified by step 528, control proceeds to step 536 and the deceleration variable A is compared to a predetermined value a6. If the deceleration variable A exceeds a6, control passes to step 538 and the warning signal is activated at the next-highest intensity level W4. If the deceleration variable A is not greater than a6, control passes to step 540 and the deceleration variable A is compared to smaller predetermined value a5. If A is greater than a5 control passes to step 542 and the next highest intensity warning signal W3 is activated. If the deceleration variable A is not greater than a5, it is next compared with a4 in step 544. If the deceleration variable A is greater than a4 control proceeds to step 546 and the warning signal is activated at the next highest intensity level W2. If the deceleration variable A is less than a4, control passes to step 548 and it is compared with the next smaller predetermined value a3. If the deceleration variable A exceeds this value, control proceeds to step 550 and the lowest intensity warning signal W1 is activated.

In step 552, the gas pedal contact 108 communicates an ON signal to the microprocessor 204 whenever the driver applies pressure to the gas pedal, and communicates an OFF signal when no pressure is sensed on the gas pedal 108a. The gas pedal contact signal is examined in step 554, which is also where control proceeds if the deceleration variable is less than or equal to a3 as determined in step 548. In step 554, if either the deceleration variable A is greater than a2 at the same time GPC=OFF, or if R>$S_y$S, control proceeds to step 550 and the lowest intensity warning signal is activated. The term R>S>allows the lowest intensity warning signal to be activated in situations where the automobile V is moving at a slow rate of speed, but not stopped. If the conditions of step 554 are not met, control proceeds to step 556 and the warning signal is deactivated. Following any one of steps 538, 542, 546, 550 or 556, control passes to step 558 and the count variable C (used to determine the duration of a warning signal) is set equal to the deceleration variable A, with A being multiplied by an adjustment factor as necessary (e.g.,×30) to account for the number of rotating magnets 304 as described above.

As can be seen, the gas pedal contact 108 signals are used by the microprocessor 204 during periods of very slight deceleration rates. These slight decelerations may occur for at least two reasons: (1) as a normal fluctuation (or readjustment) of the cruising speed, or (2) as the result of the release of pressure from the gas pedal when a driver begins a speed reduction or when he/she hesitates. As long as the gas pedal is depressed (GPC=ON), the very slight speed reductions of vehicle V are not taken into account by the microprocessor and no warning signal is sent. Otherwise, if GPC=OFF, the microprocessor 204 activates the lowest intensity warning signal. Since C=A (step 558) and A is very close to 0, this warning signal is typically activated for only short periods and the warning system responds very quickly to the application of pressure on the gas pedal 108a.

The function of the warning activated as a result of step 554 is to inform following drivers of the possibility of an impending braking event and subsequent sudden reduction in the speed of the automobile V, even before pressure is applied to the brake pedal. By warning other drivers of impending braking events, the driver reaction time and required stopping distance for the other automobiles can be substantially reduced.

Following either of steps 558 or 534, control proceeds to step 560 and the variable F is assigned the value E. These variables are used in step 524 to determine if the rate of deceleration of the automobile V is increasing or decreasing. Control next passes to step 562, which is also where control passes after step 526 or if the reset button needs to be reset as determined in step 522. In step 562, the timer delay variable T is set equal to the value of $S_y$. The value of T determines the amount of time between two different readings of the binary meter 202. Control proceeds to step 564 and the value of the delay variable T is decremented by 1. Control then passes to step 566 to determine if the timer delay variable T=0. If not, control loops back to step 564 and T is again decremented. Each timer process requires a specified amount of time. For example, if each loop requires 1 ms and T is initialized to $S_y$=500, completion of the timer loop requires 500 ms. This is the minimum amount of time that a currently enabled warning signal remains activated. After the timer delay variable T reaches zero, control returns to 508 (FIG. 5A), the binary meter 202 is again queried, and the next warning signal is determined. The count variable C represents the number of cycles to be performed after activation of a warning signal, after which the warning signal is typically deactivated. The value of the deceleration variable A is assigned to C (step 558) following activation of all but the highest intensity warning signal. In this manner, the number of cycles performed (i.e., the duration of the warning signal) increases as the rate of deceleration increases. During operation, each time a cycle is completed, C decreases by the amount $S_y$/R (step 526). Because $S_y$ decreases as the speed of the automobile V increases, the value of $S_y$/R decreases more gradually as speed of the automobile V increases. Fewer cycles are therefore performed at lower speeds. The number of cycles to be performed before deactivation of an warning signal effectively equals CR/$S_y$.

The use of a variable count value C is advantageous for a number of reasons. The count variable C allows the warning signal corresponding to the highest detected rate of deceleration to be activated for a period of time that increase for higher rates of deceleration. Thus, a high intensity warning signal can remain activated even after the automobile V has come to an abrupt stop. This allows following drivers to determine that potentially dangerous conditions still exist. This feature of the disclosed embodiment of the invention allows drivers rounding a curve, for example, to quickly determine that abrupt action may be required. When speed reductions are less dramatic, the warning signal is held on for a shorter period of time.

As can be seen, the count variable C is reset each time a higher or equivalent rate of deceleration is measured (steps 524 and 558). Further, the duration of each cycle (i.e., the value of the timer delay variable T) decreases as the speed of the vehicle increases, allowing faster response times to new data to be achieved at higher speeds. Shorter cycle times at higher speeds also allows the binary meter 202 to always be implemented with a reasonable number of bits.

For a given braking intensity, as an automobile slows down, its deceleration rate as compared to its speed increases. On the contrary, the faster the automobile travels, the less dramatic its deceleration rate compared to its speed. Suppose the deceleration rate is expressed as a percentage of lost speed per unit of time. As the automobile slows to a complete stop, this percentage approaches one hundred as the speed approaches zero.

The intensity of a warning signal in accordance with the present invention is related to both the absolute speed and the rate of deceleration. If the absolute speed of an automobile were not taken into account, the warning signal intensity might be higher than desirable for a given rate of deceleration. For example, the warning signal intensity might be unnecessarily high in less dangerous situations such as slow city traffic. Conversely, the warning signal intensity might be lower than desirable for a given rate of deceleration in potentially dangerous situations, such as high speed interstate traffic. In the present invention, this problem is solved by the use of a constant R in the formula for the calculation of $S_{y+1}$.

The faster a mass is traveling, the longer it takes to slow it down (in both time and distance). Consequently, when an automobile is decelerating at high speed, it is desirable to send a more intense warning signal level than that sent when decelerating at lower speeds. Use of the constant R in the calculation of $S_{y+1}$, causes $S_{y+1}$ to decrease and the deceleration variable A to increase when the automobile's speed increases. By subtracting the product PXR/$S_y$ from R−Y in step 512, the tendency of A to increase as the decelerating automobile slows down is reversed. As calculated in the disclosed embodiment of the invention, the deceleration variable A becomes a smaller value as the speed of a decelerating automobile decreases. Therefore, the intensity of the corresponding warning signal W(n) is also reduced.

In the disclosed embodiment of the invention, $S_{y+1}$ also decreases when the road conditions degrade. Specifically, use of the adjustment variable Y in step 512 causes the amplitude of the increase in the deceleration variable A to be more pronounced at higher speeds when ambient weather/road conditions have a greater impact on braking distance. Thus, the warning signal intensity level W(n) increases at such times.

In the disclosed embodiment of the invention, variations in wheel sizes and sensor 104 configurations are accounted for by use of the preset wheel and/or sensor standardization coefficient X in the formula $S_{y+1}=(R-Y)-(PXR/S_y)$. In effect, the standardization coefficient X increases or decreases the number of pulses P read from the binary meter 202 as necessary to achieve consistent results in automobiles having mechanical differences.

Thus, a passive warning system capable of instantly communicating vehicular deceleration and other emergency information has been described. A microprocessor-based warning system according to the invention accounts for variation as in vehicular speed and ambient driving conditions in generating a warning signal having a blinking rate related to the rate of deceleration. The warning system is also increasingly responsive to deceleration as the speed of the automobile increases, allowing braking information to be communicated within a shorter period of time at higher speeds.

In one embodiment of the invention, the microprocessor is also programmed to keep the highest warning signal activated for a given period of time in order to inform vehicles arriving in the vicinity of a sudden speed reduction and the possibility that hazardous traffic conditions still exist. Further, a warning system according to the invention can be configured to communicate a high intensity warning signal if the wheels of the vehicle become suddenly blocked or rotate at a rate that is disproportionate to the speed of the vehicle, as might occur during icy driving conditions. Various other embodiments of the invention have also been described.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A warning system for use in an automobile, the warning system communicating a warning signal of variable blinking rate in response to specified deceleration rates experienced by the automobile, comprising:
a sensor for gathering information related to the speed of the automobile;
a warning signal light capable of displaying warning signals of varying blinking rates;
a microprocessor coupled to said sensor and said warning signal light;
a memory coupled to said microprocessor, said microprocessor memory containing instructions directing said microprocessor to repeatedly perform the steps of:
retrieving, from said sensor, the information related to the speed of the automobile;
utilizing the information related to the speed of the automobile over time to calculate a deceleration value representative of the rate of deceleration being experienced by the automobile;
adjusting the deceleration value according to the speed of the automobile;
comparing said adjusted deceleration value to at least one of a plurality of predetermined ranges of values; and
activating said warning signal light at one of a plurality of blinking rates if said adjusted deceleration value is within a corresponding predetermined range of values.

2. The warning system of claim 1, wherein said memory directs said microprocessor to perform said step of retrieving information related to the speed of the automobile at an increasing frequency as the speed of the automobile increases.

3. The warning system of claim 1, wherein said memory further directs said microprocessor, prior to comparing said adjusted deceleration value to at least one of a plurality of predetermined ranges of values, to perform the step of adjusting the deceleration value according to a value representing ambient driving conditions, such that a faster blinking rate warning signal is activated in response to deteriorating ambient driving conditions.

4. The warning system of claim 3, wherein the automobile incorporates windshield wipers, and wherein the value representing ambient driving conditions is adjusted in response to activation of the windshield wipers.

5. The warning system of claim 3, wherein the automobile incorporates headlights, and wherein the value representing ambient driving conditions is adjusted in response to activation of the headlights.

6. The warning system of claim 1, wherein said step of activating said warning signal light at one of a plurality of blinking rates comprises activating said warning signal at one of at least three discrete blinking rates, and wherein said warning signal light is activated at faster blinking rates in response to higher rates of deceleration.

7. The warning system of claim 1, wherein said sensor comprises:
a fixed magnet;
a sensor disc disposed within the automobile such that said sensor disc rotates relative to motion of the automobile; and
at least one rotating magnet coupled to said sensor disc, said fixed magnet, said sensor disc and said at least one rotating magnet being spatially arranged such that rotation of said sensor disc causes said at least one rotating magnet to pass with sufficient proximity to said fixed magnet to induce an electrical pulse, the speed of the automobile being determined by the number of such pulses in a given amount of time.

8. The warning system of claim 7, further comprising a binary meter, wherein the electrical pulses generated by said sensor are received by said binary meter for provision to said microprocessor.

9. The warning system of claim 1, wherein the automobile incorporates a gas pedal, further comprising:
a gas pedal contact, said gas pedal contact generating an electrical signal indicating a lack of pressure being applied to the gas pedal, wherein for predetermined deceleration values said warning signal light is activated if the electrical signal is present, said warning signal light being otherwise deactivated.

10. The warning system of claim 1, further comprising:
a reset button, wherein said reset button must be actuated in order to deactivate said warning signal light following activation of said warning signal light at a predetermined one of said plurality of blinking rates.

11. The warning system of claim 1, the automobile further incorporating hazard lights, wherein:
said step of activating said warning signal light at one of a plurality of blinking rates further comprises activating the hazard lights when said warning signal light is activated at a predetermined one of said plurality of blinking rates.

12. The warning system of claim 1, wherein said step of activating said warning signal light at one of a plurality of blinking rates further comprises maintaining the selected blinking rate alarm signal in an activated state for a predetermined amount of time, the predetermined amount of time increasing proportionately to increases in said adjusted deceleration value.

13. The warning system of claim 12, wherein the predetermined amount of time is reset if an equal or higher blinking rate alarm signal is selected before expiration of an immediately subsequent predetermined amount of time.

14. The warning system of claim 1, wherein said step of activating said warning signal light at one of a plurality of blinking rates further comprises activating said warning signal if the wheels of the automobile rotate at a rate that is disproportionate to the speed of the vehicle.

15. The warning system of claim 1, wherein said warning signal light is comprised of an amber portion and a red portion.

16. The warning system of claim 1, wherein said step of activating said warning signal light at one of a plurality of blinking rates further comprises activating said warning signal if the speed of the automobile falls below a predetermined value.

17. A method for communicating an automotive warning signal of variable blinking rates in response to specified deceleration rates experienced by an automobile incorporating a warning signal light, the method comprising the steps of:

gathering information related to the speed of the automobile;

utilizing the information related to the speed of the automobile over time to calculate a deceleration value representative of the rate of deceleration being experienced by the automobile;

adjusting the deceleration value according to the speed of th,e automobile, wherein a given deceleration value is accorded a more significant numerical value at higher speeds;

comparing the adjusted deceleration value to at least one of a plurality of predetermined ranges of values; and activating the warning signal light at one of a plurality of blinking rates if said adjusted deceleration value is within a corresponding predetermined range of values, wherein higher blinking rates correspond to more significant values than lower blinking rates.

18. The method of claim 17, wherein the step of gathering information related to the speed of an automobile is performed more frequently as the speed of the automobile increases.

19. The method of claim 17, further comprising the step of adjusting the deceleration value according to a value representing ambient driving conditions.

* * * * *